(12) United States Patent
Kuwano (10) Patent No.: US 11,465,452 B2
(45) Date of Patent: Oct. 11, 2022

(54) PNEUMATIC TIRE

(71) Applicant: TOYO TIRE & RUBBER CO., LTD., Itami (JP)

(72) Inventor: Shingo Kuwano, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 467 days.

(21) Appl. No.: 16/209,303

(22) Filed: Dec. 4, 2018

(65) Prior Publication Data

US 2019/0193477 A1    Jun. 27, 2019

(30) Foreign Application Priority Data

Dec. 26, 2017   (JP) .............................. JP2017-249322

(51) Int. Cl.
*B60C 13/00*    (2006.01)
*B60C 11/13*    (2006.01)
(Continued)

(52) U.S. Cl.
CPC .......... *B60C 11/1369* (2013.01); *B60C 11/01* (2013.01); *B60C 11/032* (2013.01);
(Continued)

(58) Field of Classification Search
CPC ....... B60C 13/00; B60C 13/02; B60C 13/002; B60C 13/023; B60C 2013/026; B60C 2011/013; B60C 2011/016; B60C 11/01
See application file for complete search history.

(56) References Cited

U.S. PATENT DOCUMENTS

2002/0011293 A1   1/2002  Zanzig et al.
2009/0107600 A1   4/2009  Missik-Gaffney et al.
(Continued)

FOREIGN PATENT DOCUMENTS

CN      107031296 A     8/2017
JP     2002-301903 A   10/2002
(Continued)

OTHER PUBLICATIONS

Office Action dated Aug. 4, 2020, issued in counterpart CN Application No. 201811517712.5, with English translation.(16 pages).
(Continued)

*Primary Examiner* — Cedrick S Williams
(74) *Attorney, Agent, or Firm* — WHDA, LLP (57) ABSTRACT

A pneumatic tire has paired bead portions, paired sidewall portions, a tread portion, a plurality of lug grooves extending from a shoulder area of the tread portion to reach a buttress area of the sidewall portion, and a block defined by the plurality of lug grooves. The block includes a shoulder block provided in the shoulder area and a buttress block provided in the buttress area. At least some of the plurality of lug grooves end at a connecting portion connecting the paired buttress blocks, the connecting portion is provided on an inner side in the tire diametrical direction of position that are 50% of length in the tire diametrical direction of the buttress block from upper end position of the buttress block. A step or a protrusion where the buttress block has a largest upraised height is provided in the tire diametrical position of the connecting portion.

9 Claims, 10 Drawing Sheets

(51) Int. Cl.
*B60C 11/03* (2006.01)
*B60C 11/01* (2006.01)
*B60C 13/02* (2006.01)

(52) U.S. Cl.
CPC .......... *B60C 11/0311* (2013.01); *B60C 13/02* (2013.01); *B60C 2011/013* (2013.01); *B60C 2011/0358* (2013.01); *B60C 2200/14* (2013.01)

(56) References Cited

U.S. PATENT DOCUMENTS

| | | | |
|---|---|---|---|
| 2013/0086807 A1* | 4/2013 | Zhu | B60C 11/01 |
| | | | 29/894.3 |
| 2017/0166013 A1 | 6/2017 | Kuwano | |
| 2019/0016179 A1* | 1/2019 | Yamakawa | B60C 11/1236 |
| 2019/0299719 A1* | 10/2019 | Murata | B60C 11/01 |

FOREIGN PATENT DOCUMENTS

| | | | |
|---|---|---|---|
| JP | 2015-168301 A | 9/2015 | |
| JP | 2017-124733 A | 7/2017 | |
| JP | 6194984 B1 | 9/2017 | |
| JP | 2017-213925 A | 12/2017 | |

OTHER PUBLICATIONS

Office Action dated Sep. 8, 2021, issued in counterpart JP Application No. 2017-249322, with English Translation. (6 pages).

* cited by examiner

PNEUMATIC TIRE

BACKGROUND OF THE INVENTION

Field of the Invention

The present invention relates to a pneumatic tire intended for traveling on a punishing road such as a muddy ground and a rocky stretch.

Description of the Related Art

There are known pneumatic tires each of which has a plurality of buttress blocks arranged in buttress area of a sidewall portion for the purpose of enhancing driving performance on a punishing road such as a muddy ground and a rocky stretch. With the tire having such buttress blocks, traction is generated by shearing resistance in traveling on the punishing road (traction effect), which enhances punishing road run-through performance. Moreover, since the buttress blocks are provided, it is possible to keep an external injury factor such as angular portions of rock surfaces away from outer surface of the sidewall portion (protection effect), which improves external injury resistance.

In each of Patent Documents 1 and 2, a pneumatic tire having an annular rib extending in annular shape across buttress blocks is described. In Patent Document 3, an annular rib is provided at upper end position of buttress block. In general, an upraised height of a buttress block from outer surface of sidewall portion is the largest part of annular rib and the buttress block extends inward in a tire diametrical direction with the fixed upraised height or the gradually reducing upraised height. The present inventor has paid attention to the fact that the upraised height of the buttress block is not very large despite exposure of the outer surface of the sidewall portion around the lower end position of the buttress block and found that there is room for enhancement of the protection effect by improving the upraised height of the buttress block.

PRIOR ART DOCUMENTS

Patent Documents

Patent Document 1: JP-A-2017-124733
Patent Document 2: JP-A-2015-168301
Patent Document 3: JP-B-6194984

SUMMARY OF THE INVENTION

The present invention has been made in view of the above-described circumstances and its object is to provide a pneumatic tire with external injury resistance improved by enhancement of protection effect of a buttress area.

The object can be achieved by the following present invention. The present invention provides a pneumatic tire comprising a pair of bead portions, a pair of sidewall portions extending outward in a tire diametrical direction from each of the pair of bead portions, a tread portion connected to an outer end of each of the pair of sidewall portions in a tire diametrical direction, a plurality of lug grooves extending outward in a tire width direction from a shoulder area of the tread portion to reach a buttress area of the sidewall portion, and a block defined by the plurality of lug grooves, wherein the block includes a shoulder block provided in the shoulder area and a buttress block provided in the buttress area, wherein at least some of the plurality of lug grooves end at a connecting portion connecting the paired buttress blocks defined by the at least some of the lug grooves, the connecting portion is provided on an inner side in the tire diametrical direction of a position that are 50% of a length in the tire diametrical direction of the buttress block from upper end position of the buttress block, and wherein a step or a protrusion where the buttress block has a largest upraised height from an outer surface of the sidewall portion is provided in the tire diametrical position of the connecting portion.

With this structure, a degree of exposure of the outer surface of the sidewall portion is reduced by the connecting portion in an area around a lower end position of the buttress block. Furthermore, in traveling on a punishing road such as a rocky stretch, the step or the protrusion where the buttress block has the largest upraised height are likely to come in contact with an external injury factor earlier than the other portions and it is possible to properly keep the causes of the external damage away from the outer surface of each of the sidewall portion. As a result, the protection effect in the buttress area is enhanced, which improves external injury resistance.

An annular rib extending in an annular shape in a tire circumferential direction across the buttress blocks may be provided in the buttress area and the connecting portions may be provided at positions displaced inward in the tire diametrical direction from the annular rib. In this way, it is possible to enhance the protection effect in the area around the lower end position of the buttress block as described above to thereby improve the external injury resistance.

It is preferable that the connecting portion is provided at a lower end position of the buttress block. In this way, it is possible to enhance the protection effect at the lower end position of the buttress block as described above to thereby improve the external injury resistance.

It is preferable that one or two of the lug grooves that end at the connecting portion and one or two of the lug grooves that do not end at the connecting portion are arranged alternately in the tire circumferential direction. In this way, the lug grooves that end at the connecting portion and the lug grooves that do not end at the connecting portion are mixed suitably to be able to exert a proper balance of traction effect and protection effect.

It is preferable that a length of the connecting portion in the tire diametrical direction is 30% to 50% of the length of the buttress block in the tire diametrical direction. Since the ratio is 30% or higher, the proper length of the connecting portion in the tire diametrical direction is secured, which is effective in enhancing the protection effect. Since the ratio is 80% or lower, the connecting portion is not longer than necessary in the tire diametrical direction, which is preferable in order to allow the buttress block to exert the traction effect.

DETAILED DESCRIPTION OF THE PREFERRED EMBODIMENTS

Figure 1:
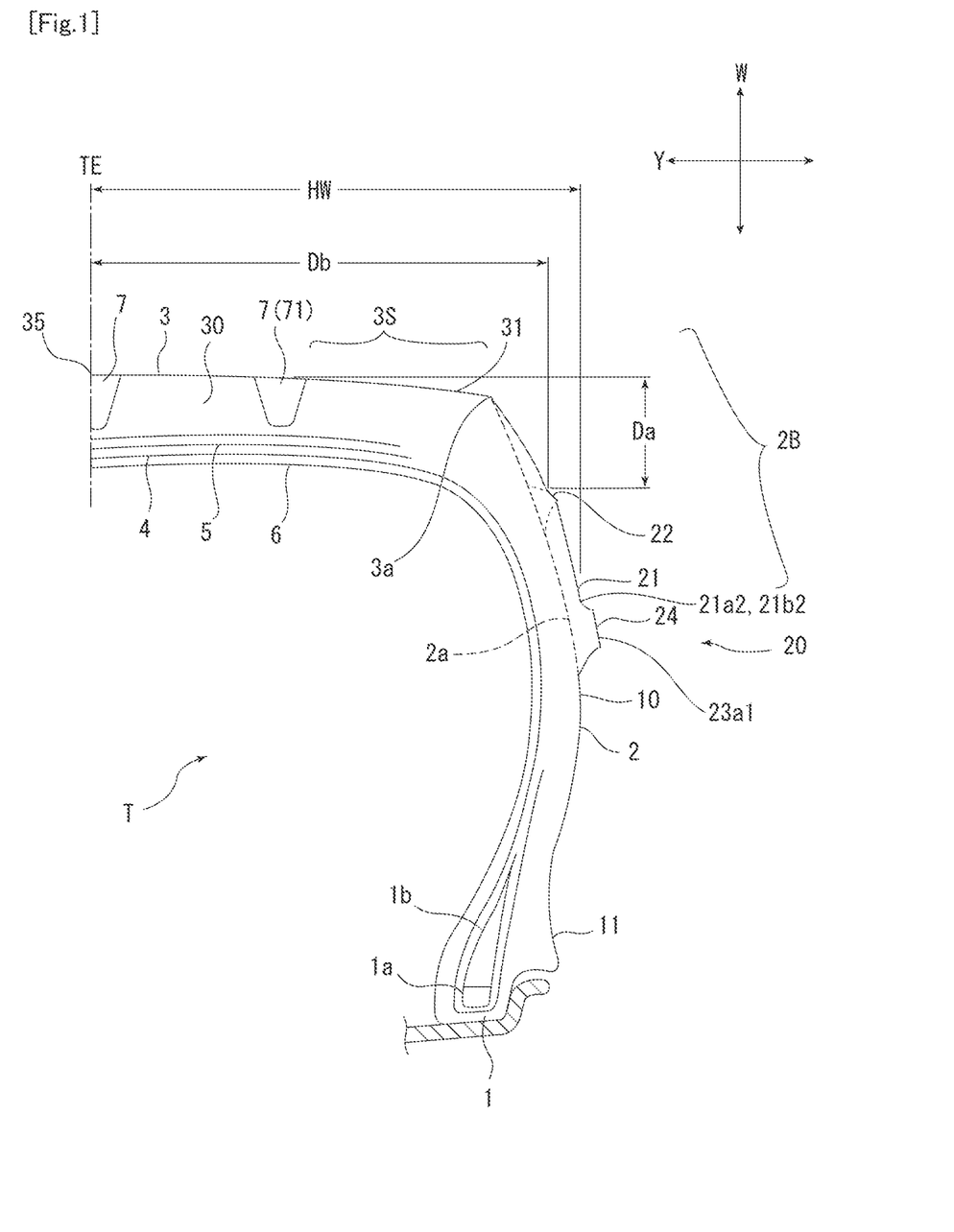
FIG. 1 is a half sectional view along a tire meridian and schematically showing an example of a pneumatic tire according to the present invention.
Figure 2:
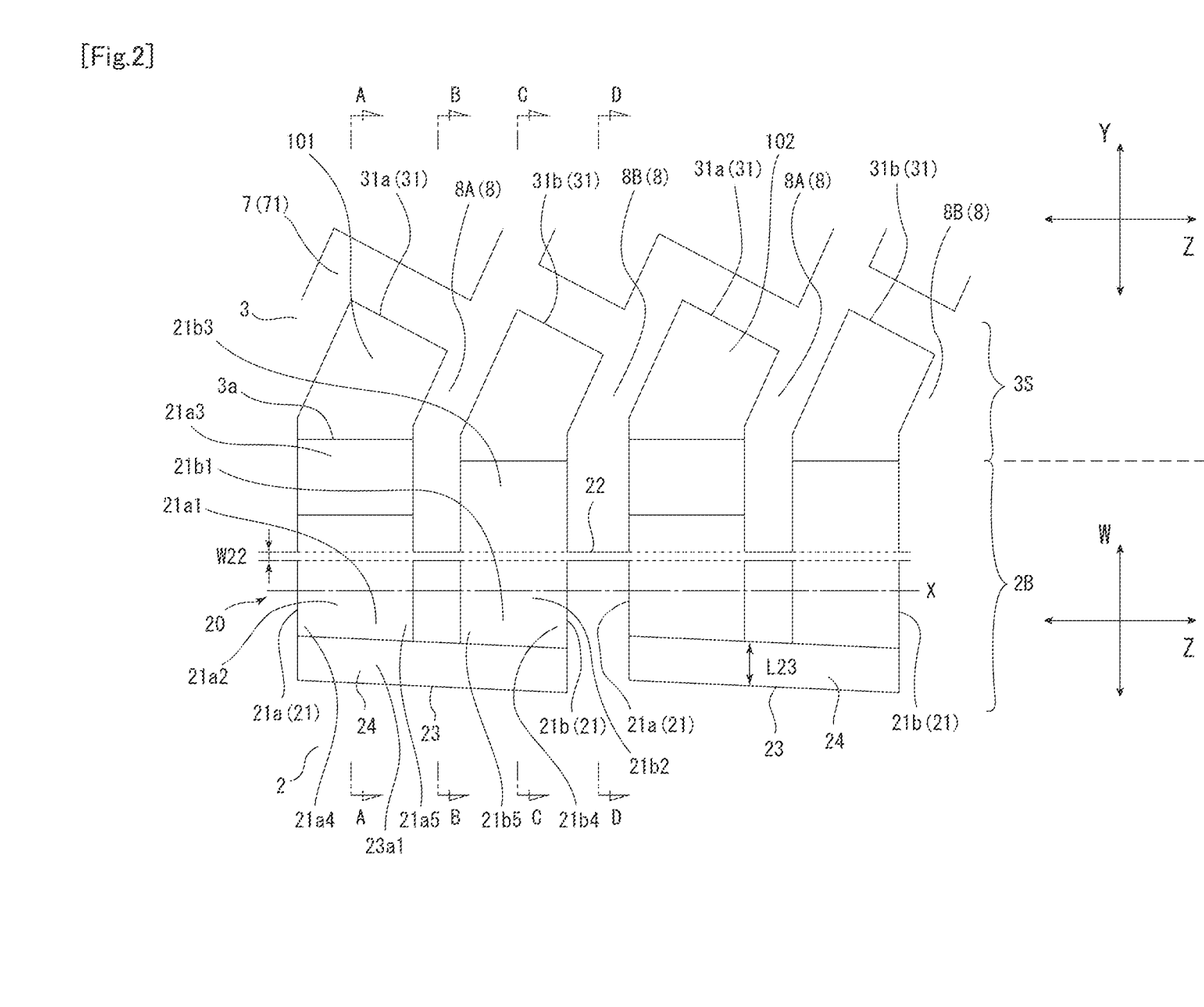
FIG. 2 is a developed view schematically showing a shoulder area and a buttress area of the pneumatic tire in FIG. 1.

Embodiments of the present invention will be described below with reference to the drawings. FIG. 1 is a half sectional view along a tire meridian and schematically showing an example of a pneumatic tire according to the invention. FIG. 1 corresponds to a section along line C-C in FIG. 2. FIG. 2 is a developed view schematically showing a shoulder area and a buttress area of the pneumatic tire. In FIG. 2, a left-right direction corresponds to a tire circumferential direction, a downward direction corresponds to an outward direction in a tire width direction, and an upward direction corresponds to an inward direction in the tire width direction. FIGS. 3A to 3D are schematic views of sections along lines A-A, B-B, C-C, and D-D in FIG. 2, respectively.

The pneumatic tire T is an off-road pneumatic radial tire intended for traveling on a punishing road such as a muddy ground and a rocky stretch. As shown in FIG. 1, the pneumatic tire T includes a pair of bead portions 1, a pair of sidewall portions 2 extending outward in a tire diametrical direction W from each of the pair of bead portions 1, and a tread portion 3 connected to an outer end of each of the pair of sidewall portions 2 in the tire diametrical direction. Each of the bead portions 1 is provided with an annular bead core 1$a$ formed by covering a bundle of steel wires or the like with rubber and a bead filler 1$b$ disposed on an outer side of the bead core 1$a$ in the tire diametrical direction.

The pneumatic tire T further includes a carcass 4 provided between the pair of bead portions 1, a belt 5 provided on an outer peripheral side of the carcass 4 in the tread portion 3, and an inner liner 6 provided on an inner peripheral side of the carcass 4 in order to maintain air pressure. The carcass 4 is in a toroidal shape as a whole and has end portions each of which is rolled up to wrap the bead core 1$a$ and the bead filler 1$b$. The belt 5 includes two belt plies layered on inner and outer sides. A tread rubber 30 is provided on an outer peripheral side of the belt 5. The inner liner 6 faces an inner space of the tire T that is filled with air. In the sidewall portion 2, the inner liner 6 is directly attached to an inner peripheral side of the carcass 4 and no other member is provided between the inner liner 6 and the carcass 4.

As shown in FIGS. 1 and 2, a plurality of main grooves 7 extending along the tire circumferential direction Z and a plurality of lug grooves 8 extending in directions intersecting the tire circumferential direction are formed in a surface of the tread rubber 30. The plurality of lug grooves 8 is arranged at intervals in the tire circumferential direction. The pneumatic tire T has the plurality of lug grooves 8 extending outward in the tire width direction Y from the shoulder area 3S of the tread portion 3 to reach the buttress area 2B of the sidewall portion 2 and blocks defined by the plurality of lug grooves 8. The blocks defined by the lug grooves 8 include shoulder blocks 31 provided in the shoulder area 3S and buttress blocks 21 provided in the buttress area 2B. The plurality of shoulder blocks 31 and the plurality of buttress blocks 21 are respectively arranged at intervals in the tire circumferential direction. As shown in FIG. 1, tread portion is provided with an edge 3$a$ extending along an outer end of the tire width direction Y of the tread portion.

The shoulder area 3S is an area on outer sides of the shoulder main groove 71 in the tire width direction in the tread portion 3. The shoulder main groove 71 is positioned on the outermost side in the tire width direction among the plurality of main grooves 7. The shoulder blocks 31 are provided on the outer side in the tire width direction of the shoulder main groove 71. In the present embodiment, what is called staggered shoulder is employed. In the staggered shoulder, the shoulder blocks 31$a$ having edges on relatively inner sides in the tire width direction and the shoulder blocks 31$b$ having edges on relatively outer sides in the tire width direction are arranged alternately in the tire circumferential direction. With this structure, traction is generated by shearing resistance of the shoulder blocks 31$b$ having the edges protruding farther outward than the shoulder blocks 31$a$, which improves punishing road run-through performance.

The buttress area 2B is an outer area of the sidewall portion 2 in the tire diametrical direction. More specifically, the buttress area 2B is an area on the outer side in the tire diametrical direction of tire maximum width position 10 and is a portion that does not come in contact with a ground during normal traveling on a flat paved road. On a soft road such as the muddy ground and sandy soil, each of the tires sinks under a weight of a vehicle and the buttress area 2B comes in virtual contact with the ground. The tire maximum width position 10 is a position where profile line of the tire T is farthest from a tire equator TE in the tire width direction. The profile line of the tire T is an outline of an outer surface of the sidewall portion 2 excluding protrusions, such as a rim protector 11 and normally has a sectional shape along the meridian defined by smoothly connecting a plurality of arcs.

As shown in FIGS. 2 and 3A to 3D, a plurality of block groups 101, 102 are provided. Each block group includes the buttress blocks 21 and the shoulder blocks 31. The buttress block extends along the tire diametrical direction to reach the radially inside portion 21$a$1, 21$b$1 of the buttress block 21. The buttress blocks 21 are upraised from the outer surface 2$a$ of the sidewall portion 2 along the profile line of the tire T. Lower end positions P2 of the buttress blocks 21 are positioned on the outer side of the tire maximum width position 10 in the tire diametrical direction. The lower end positions P2 correspond to inner ends of top faces of the buttress blocks 21 in the tire diametrical direction. A distance Dc from each of the lower end positions P2 to the tire maximum width position 10 in the tire diametrical direction is 0 to 30 mm, for example.

In the present embodiment, buttress blocks 21$a$ disposed on the outer side of the shoulder blocks 31$a$ in the tire width direction and the buttress blocks 21$b$ disposed on the outer side of the shoulder blocks 31$b$ in the tire width direction are arranged alternately in the tire circumferential direction. In a portion not shown in the figures, the two kinds of buttress blocks 21$a$ and 21$b$ are arranged in the tire circumferential direction and the block arrangements form annular block row 20. However, not two but three or more kinds of buttress blocks may form the annular block row 20. Each of the buttress blocks 21$a$, 21$b$ has a radially inside portions 21$a$1, 21$b$1 and a radially outside portion 21$a$3, 21$b$3. The radially inside portion 21$a$1 has a circumferentially inside part 21$a$5 and a circumferentially outside part 21$a$4. The radially inside portion 21b1 has a circumferentially inside part 21b5 and a circumferentially outside part 21b4.

Since the tire T in the present embodiment is provided with the plurality of buttress blocks 21, the traction effect is exerted by the shearing resistance of the buttress blocks 21 in traveling on the punishing road such as the muddy ground and the rocky stretch, which enhances the punishing road run-through performance. Moreover, because the buttress blocks 21 are provided, it is possible to exert protection effect which is keeping an external injury factor such as angular portions of rock surfaces away from the outer surface 2a of the sidewall portion 2 to thereby improve external injury resistance.

Figure 3A:
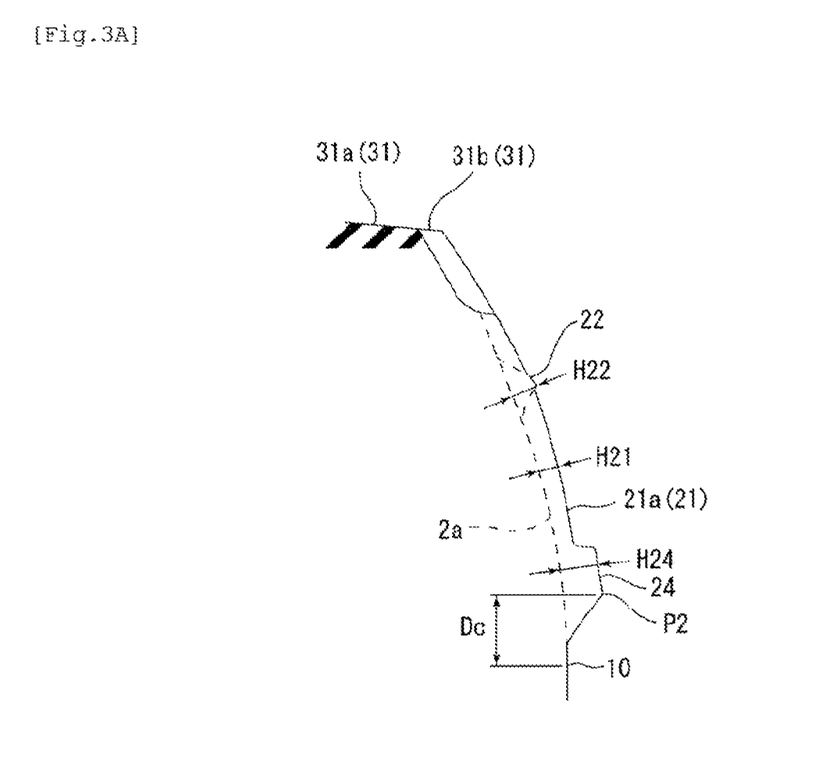
FIG. 3A is a schematic view of a section along line A-A in FIG. 2.
Figure 3B:
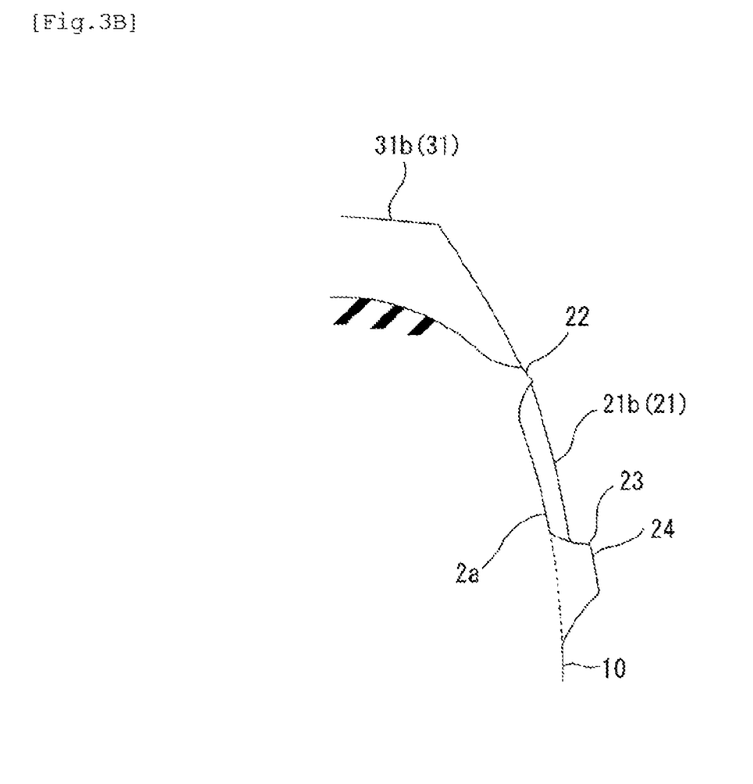
FIG. 3B is a schematic view of a section along line B-B in FIG. 2.

As shown in FIG. 2, at least some lug grooves 8A of the plurality of lug grooves 8 end at connecting portions 23 that connect the paired buttress blocks 21, 21 (i.e., the buttress blocks 21a and the buttress blocks 21b) defined by the lug grooves 8A. As shown in FIG. 3B, the connecting portions 23 are upraised from the outer surface 2a of the sidewall portion 2. In the present embodiment, the plurality of lug grooves 8 includes the lug grooves 8A that end at the connecting portions 23 and the lug grooves SB that do not end at the connecting portions 23. While the lug grooves 8A are closed with the connecting portions 23, the lug grooves 8B are not closed and are open inward in the tire diametrical direction at the lower end positions P2.

Figure 3C:
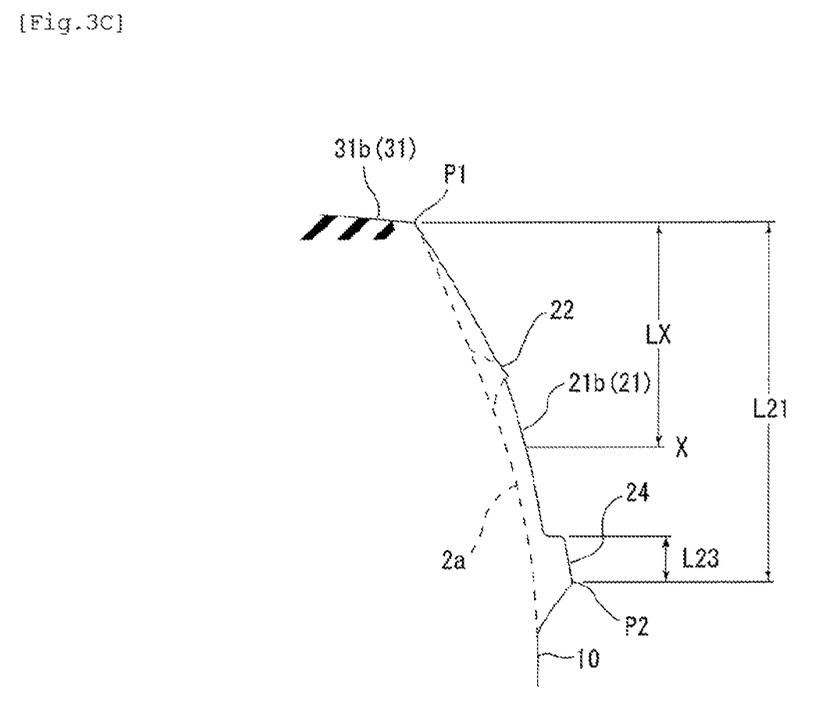
FIG. 3C is a schematic view of a section along line C-C in FIG. 2.
Figure 3D:
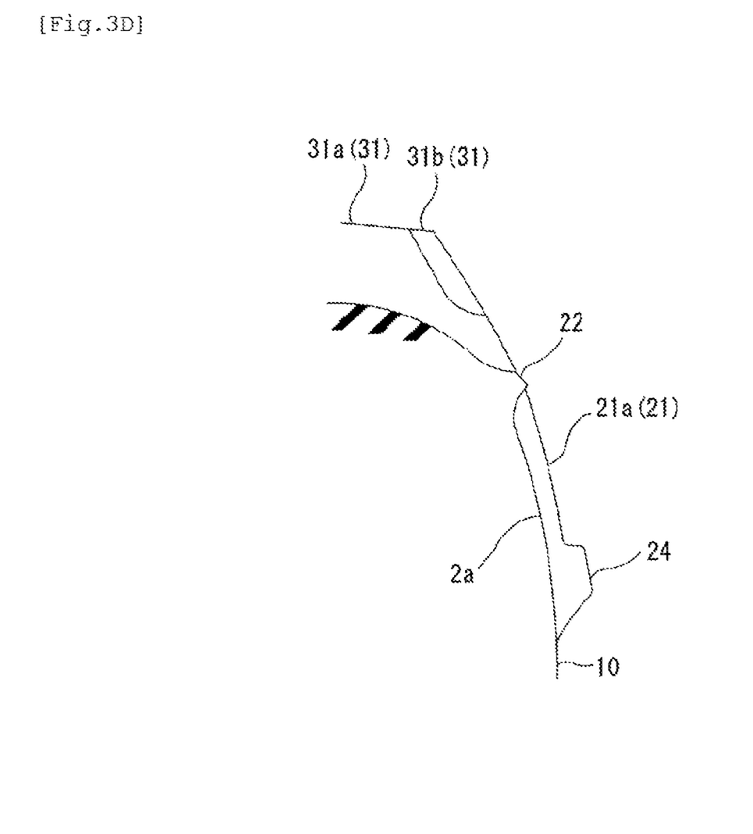
FIG. 3D is a schematic view of a section along line D-D in FIG. 2.

The connecting portions 23 are provided on the inner side in the tire diametrical direction of a position X that is 50% of lengths L21 in the tire diametrical direction of the buttress blocks 21 connected by the connecting portions 23 from upper end positions P1 of the buttress blocks 21 (see FIG. 3C). The upper end position P1 corresponds to outer end of the top face of the buttress block 21 in the tire diametrical direction. The length L21 is obtained as tire diametrical distance from the upper end position P1 to the lower end position P2. Tire diametrical length LX from the upper end position P1 to the position X is 50% of the length L21. If the paired buttress blocks defined by the lug grooves have the different tire diametrical lengths, the larger tire diametrical length (the tire diametrical length L21 of the buttress block 21b in the present embodiment) is used to determine the position X.

The tire T is provided, at a tire diametrical position of the connecting portion 23, with a step 24 where the buttress block 21 has the largest upraised height from the outer surface 2a of the sidewall portion 2. The upraised height H24 of the step 24 from the outer surface 2a is larger than an upraised height H21 of the other portion of the buttress block 21. In the present embodiment, the upraised height of the buttress block 21 changes along the tire diametrical direction. To put it concretely, the upraised height gently and gradually reduces inward in the tire diametrical direction from an annular rib 22 (described later). The portion having the largest upraised height (hereafter referred to as "largest upraised height portion") is formed by the step 24 in the tire diametrical position of the connecting portion 23. The step 24 includes the connecting portion 23 and extends in a belt shape in opposite directions in the tire circumferential direction from the connecting portion 23.

Since the connecting portions 23 are provided in the buttress area 2B, a degree of exposure of the outer surface 2a of the sidewall portion 2 reduces in an area on the inner side of the position X in the tire diametrical direction, i.e., an area around the lower end position P2 of the buttress block 21. Furthermore, in traveling on the punishing road such as the rocky stretch, the step 24 where the buttress block 21 has the largest upraised height is likely to come in contact with the causes of the external damage earlier than the other portions and it is possible to properly keep the causes of the external damage away from the outer surface 2a of the sidewall portion 2. As a result, the protection effect in the buttress area 2B is enhanced, which improves the external injury resistance. In order to secure the improvement, the upraised height H24 of the step 24 is preferably 0.5 mm to 5 mm. As shown in FIGS. 1 and 2, the connecting portion 23 has a second outer surface 23a1 that is higher than a third outer surface 21a2 of the first buttress block 21a and a fourth outer surface 21b2 of the second buttress block 21b, each of the second outer surface 23a, the third outer surface 21a2, and the fourth outer surface 21b2 being upraised from the outer surface 2a.

In the present embodiment, the annular rib 22 extending in an annular shape in the tire circumferential direction across the buttress blocks 21 is provided in the buttress area 2B and the connecting portions 23 are provided at positions displaced inward in the tire diametrical direction from the annular rib 22. The annular rib 22 is upraised from the outer surface 2a similarly to the buttress blocks 21. In the present embodiment, the annular rib 22 has a sectional shape that is a shape of a mountain with a flat top face. To put it more concretely, the sectional shape is a shape of a stratovolcano with a slope gently curved and constricted. However, the sectional shape is not limited to this shape and may foe other shapes such as a rectangular or trapezoidal shape with a flat top face and a triangular shape with a tapered top face. An upraised height H22 of the annular rib 22 from the outer surface 2a is 5 mm or larger, for example, and is preferably 8 mm or larger. The upraised height H22 is larger than the upraised height H21 and smaller than the upraised height H24.

The annular rib 22 is provided at such a position that a distance Da shown in FIG. 1 is in a range of 20 mm to 40 mm, for example. The distance Da is obtained as a tire diametrical distance from an outermost diametrical position 35 of the tire T to an outer edge in the tire diametrical direction of the top face of the annular rib 22. The annular rib 22 is provided at such a position that the distance Db in FIG. 1 equals to 75% or more of a half width HW of the tire section, for example. The distance Db is obtained as a distance in the tire width direction from the tire equator TE to the outer edge in the tire diametrical direction of the top face of the annular rib 22. The half width HW of the tire section is obtained as the distance in tire width direction from the tire equator TE to the tire maximum width position 10.

In the present embodiment, the connecting portion 23 is provided at the lower end position P2 of the buttress block 21. Therefore, as compared with the case where the connecting portion 23 is not provided at the lower end position P2, the largest upraised height portion of the buttress block 21 is provided near the tire maximum width position 10. Since the sidewall portion 2 is especially likely to bend and cracks due to external damage easily extend around the tire maximum width position 10, it is possible to properly enhance the protection effect to thereby sufficiently improve the external injury resistance by providing the largest upraised height portions near the tire maximum width position 10 to keep the causes of the external damage away. However, the portion with the largest upraised height do not necessarily have to be provided near the tire maximum width position 10 and the connecting portion 23 may be provided at position slightly displaced outward in the tire diametrical direction from the lower end position P2.

As shown in FIG. 2, the lug grooves SB other than the lug grooves 8A that end at the connecting portions 23 among the plurality of lug grooves 8 do not end at the connecting portions 23. While the connecting portions 23 enhance the protection effect, the lug grooves 8B having more edge components than the lug grooves 8A are useful for everting the traction effect. In the present embodiment, the one lug groove 8A that ends at the connecting portion 23 and the one lug groove 8B that does not end at the connecting portion 23 are arranged alternately in the tire circumferential direction. In this way, the lug grooves 8A and the lug grooves 8B are mixed properly to be able to exert a proper balance of traction effect and protection effect. In order to obtain the improvement, preferably, one or two of the lug grooves 8A that end at the connecting portion 23 and one or two of the lug grooves 8B that do not end at the connecting portion 23 are arranged alternately in the tire circumferential direction.

Although the lug grooves 8A and the lug grooves SB are mixed in the example shown in the present embodiment, it is not absolutely necessary to mix the lug grooves 8A and the lug grooves 8B. All of the plurality of lug grooves 8 may be the lug grooves 8A that end at the connecting portions 23. In this case, because the connecting portion 23 continuously extends along the tire circumferential direction, excellent protection effect is exerted at any positions in the tire circumferential direction, which substantially improves the external injury resistance.

A length L23 of the connecting portion 23 in the tire diametrical direction is preferably 30% or more of the length L21 of the buttress block 21 in the tire diametrical direction. In this way, the proper length of each of the connecting portions 23 is secured, which is effective in enhancing the protection effect. Moreover, the length L23 is preferably 50% or less of the length L21. In this way, the connecting portions 23 are not longer than necessary, which is preferable in order to allow the buttress blocks 21 to exert the traction effect. In the present embodiment, the length L23 of the connecting portion 23 in the tire diametrical direction is greater than a length L22 of the annular rib 22 in the tire diametrical direction.

The above-described respective dimensions are measured in a normal condition in which the tire is mounted to a normal rim and filled with air to normal internal pressure under no load. The "normal rim" refers to a rim specified for each tire by standards in a standard system including the standards according to which tires are provided, and is "Standard Rim" in JATMA, "Design Rim" in TRA, or "Measuring Rim" in ETRTO, for example. Moreover, the "normal internal pressure" refers to an air pressure specified for each, tire by the standards in the standard system including the standards according to which tires are provided, and is "Maximum Air Pressure" in JATMA, a maximum value shown in Table, "TIRE LOAD LIMITS AT VARIOUS COLD INFLATION PRESSURES" in TRA, or "INFLATION PRESSURE" in ETRTO.

It is essential only that the annular block row 20 be formed on at least one of the sidewall portions 2. However, from a viewpoint of further satisfactory improvement of the protection effect and decoration effect of the buttress area, it is preferable to form the annular block rows 20 on the sidewall portions 2 on both sides.

Since the embodiments described by using FIGS. 4 to 7 have the same configurations as those of the above-described embodiment except configurations described below, the common configurations will not be described and differences will be mainly described. The same portions as those described in the above embodiment will be provided with the same reference signs and will not be described repeatedly.

Figure 4:
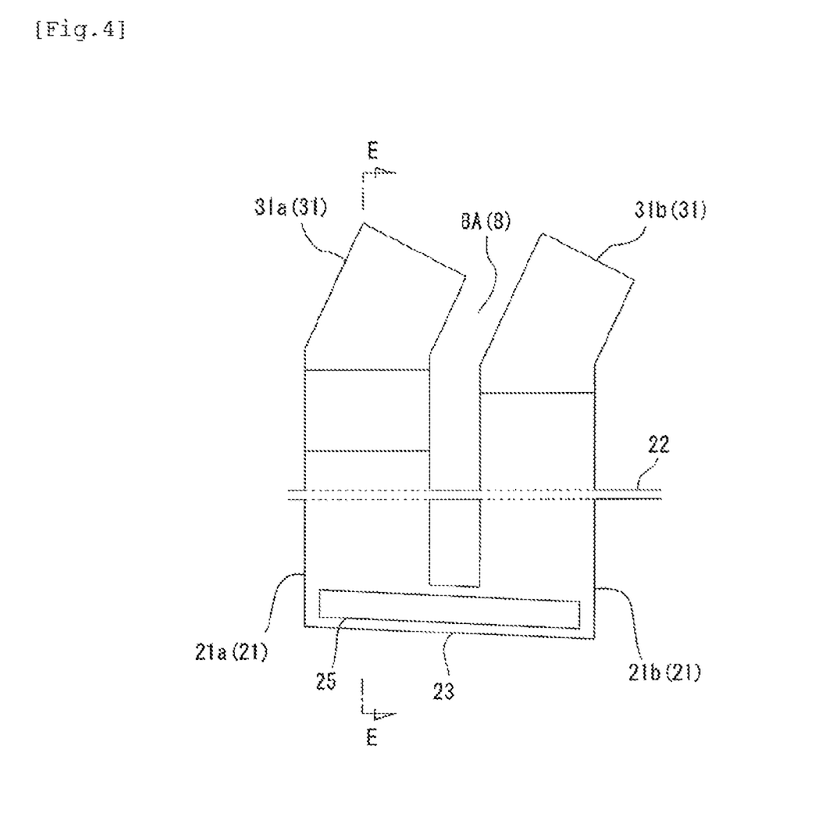
FIG. 4 is a developed view of a buttress area according to another embodiment of the invention.
Figure 5:
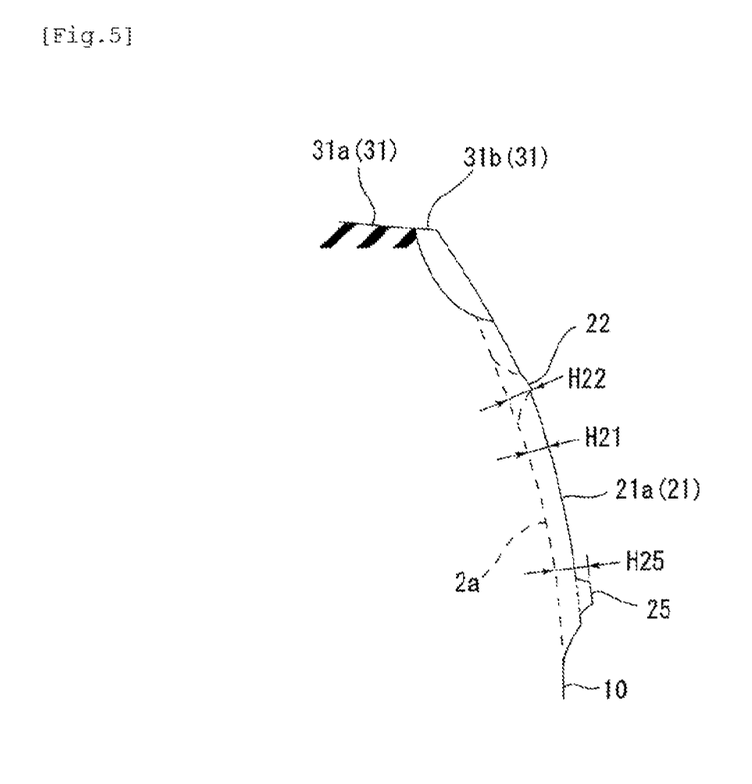
FIG. 5 is a schematic view of a section along line. E-E in FIG. 4.

In an example in FIG. 4, in place of the step 24 described above, a protrusion 25 where buttress blocks 21 have a largest upraised height from an outer surface 2a of a sidewall portion 2 is provided in a tire diametrical position of a connecting portion 23, The largest upraised height portion of the buttress block 21 is formed by the protrusion 25 in the tire diametrical position of the connecting portion 23. As shown in FIG. 5, the upraised height H25 of the protrusion 25 from the outer surface 2a is larger than an upraised height H21 of the other portion of each of the buttress blocks 21 and larger than an upraised height H22 of an annular rib 22. The protrusion 25 extends in a tire circumferential direction to cover the paired buttress blocks 21, 21 connected by the connecting portion 23. A length of the protrusion 25 in the tire diametrical direction is smaller than a length L23 of the connecting portion 23 in the tire diametrical direction (see FIGS. 2 and 3C).

Figure 6:
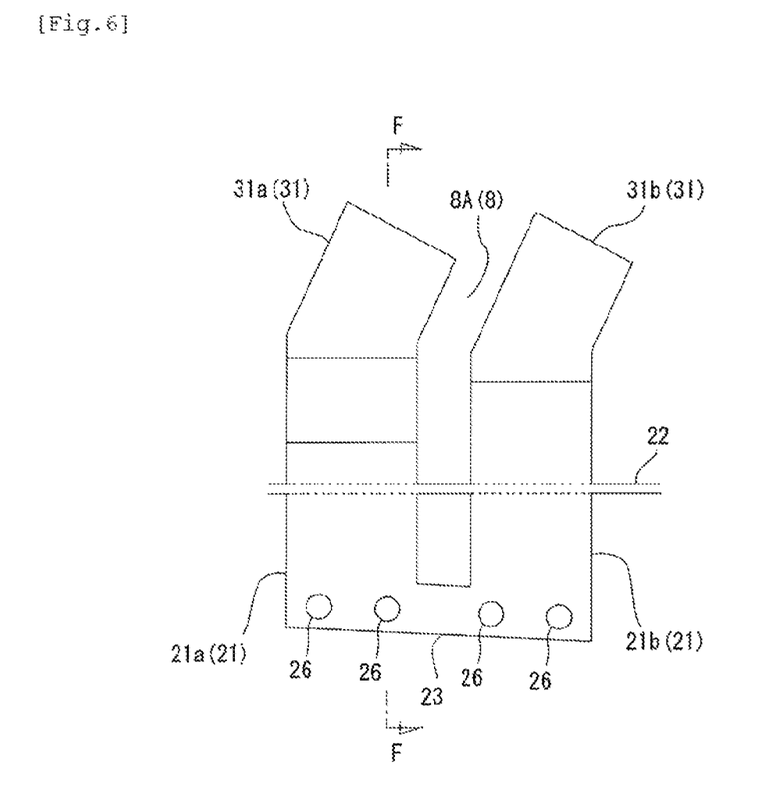
FIG. 6 is a developed view of a buttress area according to another embodiment of the invention.

In traveling on the punishing road, the protrusion 25 is likely to come in contact with the external injury factor earlier than the other portions and it is possible to properly keep the causes of the external damage away from the outer surface 2a of the sidewall portion 2 to thereby improve external injury resistance. Although the single protrusion 25 is provided in FIG. 4, not limited to this, a plurality of protrusions 26 may foe provided as shown in FIG. 6. The plurality of protrusions 26 are arranged at intervals in the tire circumferential direction. A section along line F-F in FIG. 6 is substantially the same as FIG. 5 and is not shown. Although each of the protrusions 26 is in a circular columnar shape in the present embodiment, the shape of each of the protrusions 26 is not limited to the circular columnar shape and may be other shapes including a prism such as a triangular prism and a quadrangular prism, a pyramid such as a circular cone, a triangular pyramid, and a square pyramid, a stump shape, a hemisphere, and the like.

Figure 7:
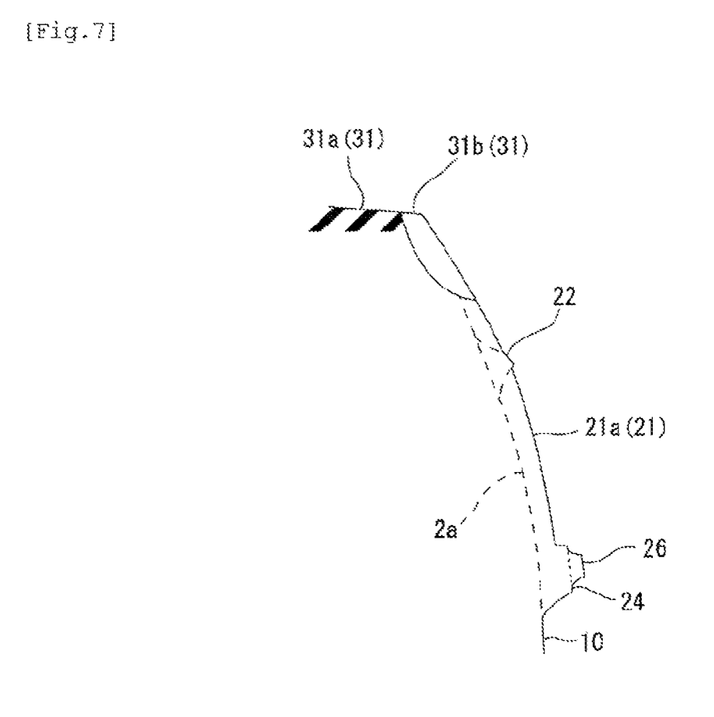
FIG. 7 is a sectional view of a buttress area according to another embodiment of the invention.

As shown in FIG. 7, it is also possible to provide a protrusion 26 (or a protrusion 25) on the step 24 described in the above embodiment. In this case, a largest upraised height portion of buttress blocks 21 is formed by the protrusion 26. Therefore, an upraised height of the step 24 may be smaller than an upraised height of an annular rib 22 or the like.

The pneumatic tire according to the invention can be formed in the same way as that of a normal pneumatic tire except that the buttress area of the sidewall portion is formed in the above-described manners. Therefore, any of conventionally known materials, shapes, configurations, and manufacturing methods can toe employed in the invention.

The present invention is not limited to the embodiment mentioned above, but can be improved and modified variously within the scope of the present invention.

What is claimed is:

1. A pneumatic tire having a tire circumferential direction, a tire width direction perpendicular to the tire circumferential direction, and a tire diametrical direction radially extending, comprising:
   a tread portion comprising:
   an edge extending along an outer end of the tire width direction of the tread portion; and
   a shoulder area in a vicinity of the edge;
   a sidewall portion extending from the edge toward a radially inside of the tire diametrical direction, the sidewall portion having a first outer surface, the sidewall portion comprising:

a buttress area in a vicinity of the edge; and
a block group comprising:
  a first block comprising:
    a first shoulder block provided in the shoulder area; and
    a first buttress block having a first radially inside portion and a first radially outside portion positioned outside the first radially inside portion in the tire diametrical direction, the first buttress block provided in the buttress area, the first radially outside portion connected to the first shoulder block, the first radially inside portion connected to a connecting portion;
  a second block comprising:
    a second shoulder block provided in the shoulder area; and
    a second buttress block having a second radially inside portion and a second radially outside portion positioned outside the second radially inside portion in the tire diametrical direction, the second buttress block provided in the buttress area, the second radially outside portion connected to the second shoulder block, the second radially inside portion connected to the connecting portion; and
  the connecting portion to connect the first radially inside portion with the second radially inside portion, the connecting portion being provided below 50% of a length from an upper end position of the first buttress block to a lower end position of the block group with respect to the tire diametrical direction,
wherein the connecting portion has a second outer surface that is higher than a third outer surface of the first radially inside portion or a fourth outer surface of the second radially inside portion, each of the second outer surface, the third outer surface, and the fourth outer surface being upraised from the first outer surface,
wherein an annular rib traverses the first buttress block and the second buttress block such that the annular rib is spaced from the connecting portion via a part of the first buttress block,
wherein the lug groove extends continuously from a portion between a radially outermost portion of the first buttress block and a radially outermost portion of the second buttress block to the annular rib.

2. The pneumatic tire according to claim 1,
wherein the sidewall portion further comprises the annular rib annularly and entirely extending along the tire circumferential direction,
wherein the annular rib is provided radially outside the connecting portion.

3. The pneumatic tire according to claim 1, wherein the first radially inside portion is located radially innermost of the first buttress block; and the second radially inside portion is located radially innermost of the of the second buttress block.

4. The pneumatic tire according to claim 1, wherein a plurality of block groups are provided, each of the block groups being the block group,
  adjacent two of the block groups are spaced from each other via the lug groove.

5. The pneumatic tire according to claim 1, wherein a plurality of block groups are provided, each of the block groups being the block group,
  wherein the connecting portion of one of the block groups is extended along the edge to reach the connecting portion of another of the block groups.

6. The pneumatic tire according to claim 1, wherein a width of the connecting portion in the tire diametrical direction is 30% to 50% of the length of the block group.

7. A pneumatic tire having a tire circumferential direction, a tire width direction perpendicular to the tire circumferential direction, and a tire diametrical direction radially extending, comprising:
a tread portion comprising:
an edge extending along an outer end of the tire width direction of the tread portion; and
a shoulder area in a vicinity of the edge;
a sidewall portion extending from the edge toward a radially inside of the tire diametrical direction, the sidewall portion having a first outer surface, the sidewall portion comprising:
a buttress area in a vicinity of the edge; and
a block group comprising:
  a first block comprising:
    a first shoulder block provided in the shoulder area; and
    a first buttress block having a first radially inside portion and a first radially outside portion positioned outside the first radially inside portion in the tire diametrical direction, the first buttress block provided in the buttress area, the first radially outside portion connected to the first shoulder block, the first radially inside portion comprising:
      a first circumferentially outside part and a first circumferentially inside part, the first circumferentially outside part being more away from the second buttress block in the tire circumferential direction than the first circumferentially inside part, the first circumferentially inside part located radially innermost of the first buttress block in the tire diametrical direction;
  a second block comprising:
    a second shoulder block provided in the shoulder area; and
    a second buttress block having a second radially inside portion and a second radially outside portion positioned outside the second radially inside portion in the tire diametrical direction, the second buttress block provided in the buttress area, the second radially outside portion connected to the second shoulder block, the second radially inside portion comprising:
      a second circumferentially outside part and a second circumferentially inside part, the second circumferentially outside part being more away from the first buttress block in the tire circumferential direction than the second circumferentially inside part, the first buttress block being spaced apart from the second buttress block via a lug groove, the second circumferentially inside part located radially innermost of the first buttress block in the tire diametrical direction; and
  a connecting portion to connect the first circumferentially inside part of the first radially inside portion with the second circumferentially inside part of the second radially inside portion,
wherein the connecting portion has a second outer surface that is higher than a third outer surface of the first radially inside portion or a fourth outer surface of the second radially inside portion, each of the second outer surface, the third outer surface, and the fourth outer surface being upraised from the first outer surface, wherein an annular rib traverses the first buttress block and the second buttress block such that the annular rib is spaced from the connecting portion via a part of the first buttress block, wherein the lug groove extends continuously from a portion between a radially outermost portion of the first buttress block and a radially outermost portion of the second buttress block to the annular rib.

8. The pneumatic tire according to claim 7, wherein the connecting portion extends in the tire circumferential direction to connect the first circumferentially outside part with the second circumferentially outside part such that the connecting portion is positioned to connect an entire of the first radially inside portion and the second radially inside portion.

9. The pneumatic tire according to claim 7, wherein the first shoulder block continued from the first buttress block is spaced apart from the second shoulder block continued from the second buttress block via the lug groove.

* * * * *